United States Patent [19]

Behner et al.

[11] 3,898,340

[45] Aug. 5, 1975

[54] ARYLIMINOTHIAZOLIDINE COMPOSITIONS AND METHODS

[75] Inventors: Otto Behner; Wilhelm Stendel, both of Wuppertal-Elberfeld, Germany

[73] Assignee: Bayer Aktiengesellschaft, Germany

[22] Filed: Nov. 21, 1973

[21] Appl. No.: 418,056

Related U.S. Application Data

[60] Division of Ser. No. 205,348, Dec. 6, 1971, Pat. No. 3,804,848, which is a continuation-in-part of Ser. No. 129,265, March 29, 1971, abandoned.

[30] Foreign Application Priority Data

Apr. 15, 1970 Germany............................ 2017969

[52] U.S. Cl. ............................................... 424/270
[51] Int. Cl............................................ C07d 91/18
[58] Field of Search .................................. 424/270

[56] References Cited

UNITED STATES PATENTS

| 3,692,912 | 9/1972 | Brokke | 424/270 |
| 3,749,787 | 7/1973 | Hepworth et al. | 424/270 |
| 3,804,848 | 4/1974 | Behner et al. | 260/306.7 T |
| 3,810,988 | 5/1974 | Janiak | 424/270 |

*Primary Examiner*—Richard J. Gallagher

[57] ABSTRACT

Thiazolidines bearing in the 3-position a lower alkyl, lower alkenyl or lower chloroalkenyl group and bearing in the 2-position an arylimino group, which in turn is substituted on the carbon atom adjacent to the imino group, are acaricides. The compounds, of which 2-(2-chlorophenylimino)-3-methylthiazolidine is representative, can be prepared in a number of ways such as through cyclization of an appropriately substituted thiourea.

108 Claims, No Drawings

ARYLIMINOTHIAZOLIDINE COMPOSITIONS AND METHODS

CROSS-REFERENCE

This is a divisional of our copending application Ser. No. 205,348, filed December 6, 1971, now U.S. Pat. No. 3,804,848, issued April 16, 1974, which in turn was a continuation-in-part of our application Ser. No. 129,265, filed March 29, 1971, now abandoned.

DETAILED DESCRIPTION

The present invention relates to 2-aryliminothiazolidines, to a process for their preparation, to their use as acaricides and to compositions adapted to this use.

2-Arylimino-3-aryl-thiazolidines are known and are described for example by F. B. Dains et al., J. Am. Chem. Soc. 44, 2637 (1922) and J. Am. Chem. Soc. 47, 1981 (1925), and O. Mitsunobo et al., Bull. Chem. Soc. Japan 39, 708 (1966). 2-Phenyl-amino-3-methyl- and ethylthiazolidines are also known, having been described for example by F. B. Dains et al., J. Am. Chem. Soc. 47, 1981 (1925) and E. Cherbuliez et al., Helv. Chim. Acta 49, 807 (1966).

The present invention pertains to 2-arylimino-3-substituted-thiazolidines of the formula:

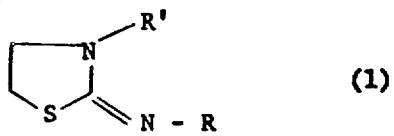

in which
R is phenyl substituted by one to three members selected from the group consisting of lower alkyl, lower alkoxy, trifluoromethyl and halo, at least one of which is in the 2-position; 1-naphthyl or 5,6,7,8-tetrahydro-1-naphthyl, and
R' is straight-chain or branched alkyl or straight-chain or branched alkenyl which is optionally substituted by one or more halogen atoms, and their salts.

The new compounds of this invention are outstandingly suitable for combatting animal ectoparasites, especially acarids.

It will be observed that the compounds of the present invention are characterized firstly by an arylimino group in the 2-position which group is further substituted on the carbon atom of the aryl ring adjacent to the imino group, and secondly by a lower alkyl, lower alkenyl or lower chloroalkenyl group in the 3-position. The aryl moiety of the arylimino substituent can thus be a 2-substituted phenyl group optionally bearing one or two additional substituents, the substituents being selected from the group consisting of lower alkyl, lower alkoxy, halogeno or trifluoromethyl. Alternatively the 2-substituent can comprise the residue of a benzo nucleus or the hydrogenated analog thereof so that the arylimino group corresponds to 1-naphthylimino or 5,-6,7,8-tetrahydro-1-naphthylimino.

Thus the substituent R in formula 1 is phenyl substituted by one to three members selected from the group consisting of lower alkyl, lower alkoxy, halogeno or trifluoromethyl, one of the substituents being in the 2-position of the phenyl ring, 1-naphthyl or 5,6,7,8-tetrahydro-1-naphthyl.

The substituent R' is a lower alkyl, a lower alkenyl group or a lower alkenyl group bearing one or more chloro substituents.

The term lower alkyl refers to a straight or branched monovalent hydrocarbon group of from 1 to 6 carbon atoms, preferably 1 to 4 carbon atoms. Representative of such groups are thus methyl, ethyl, n-propyl, isopropyl, n-butyl, isobutyl, sec.butyl, tert.butyl, pentyl, hexyl and the like. The term lower alkoxy refers to a lower alkyl group bound to the remainder of the molecule through an oxygen ether bond such as methoxy, ethoxy, n-propoxy, isopropoxy, n-butoxy and like. The term lower alkenyl refers to a lower alkyl group of at least two carbon atoms in which two adjacent carbon atoms are bound through an ethylenic bond. Lower alkenyl thus embraces such groups as vinyl, allyl (prop-2-enyl), methallyl(2-methylprop-2-enyl), prop-1-enyl, crotyl(but-2-enyl), 2,2-dimethylvinyl, 2-chloroallyl, 3-chloroallyl, 2,3-dichloroallyl and the like.

R is preferably phenyl substituted in the 2-position, the 2,4-positions or the 2,6-positions such as 2-tolyl, 2-trifluoromethylphenyl, 2-fluorophenyl, 2-chlorophenyl, 2-bromophenyl, 2-methoxyphenyl, 2,4-xylyl, 2,6-xylyl, 2-chloro-6-methylphenyl, 2-methyl-4-chlorophenyl, 2,6-dichlorophenyl, 2,6-dibromo-4-methylphenyl, 2-chloro-6-methoxyphenyl, 2-methoxy-6-methylphenyl, 2,6-dimethoxyphenyl, 2-chloro-6-trifluoromethylphenyl, 2-methyl-6-trifluoromethylphenyl or 2-methoxy-6-trifluoromethylphenyl.

R' is preferably methyl, ethyl, n-propyl, n-butyl, isopropyl, isobutyl, sec.-butyl, tert.-butyl, allyl, crotyl, methallyl, 2,2-dimethylvinyl, 2-chloroallyl, 3-chloroallyl or 2,3-dichloroallyl. Especially preferred is lower alkyl of 1 to 4 carbon atoms, allyl, dimethylvinyl and 2-chloroallyl.

These 2-arylimino-thiazolidines display strong ectoparasiticidal action, especially against strains of ticks which are resistant to phosphoric acid esters and are furthermore highly active against mange mites. Advantageously they are stable in solution or suspension or when used in a cattle dip.

The present invention also provides a process for the preparation of a 2-arylamino-thiazolidine of formula (1), or a salt thereof, in which
a. a thiourea of the formula:

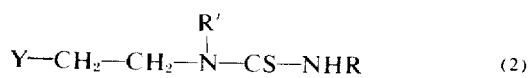

in which
R and R' are as defined above, and
Y is hydroxyl, halogeno or a sulphonyloxy group, is cyclized, optionally in the presence of a strong acid;
b. a thiourea of the general formula:

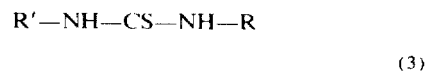

in which
R and R' are as defined above,
is allowed to react with 1,2-dihaloethane;
c. an arylamine of the general formula:

in which
R is as defined above,
is allowed to react with a 2-thiono- or 2-iminothiazolidine of the formula:

$$\underset{S}{\overset{}{\underset{}{\bigg\lceil}}}\!\!\!\!\!\!\!\!\!\!\!\!\!\!\!\!\!\!\!\!\!\underset{}{\overset{R'}{N}}\!\!\!\!\!\!\!\!\!\!\!\!\!\!\!\!\!\!\!\!\!\!\!\!\!\!\!\underset{}{\overset{}{=S}} \qquad (5)$$

or $$\underset{S}{\overset{}{\underset{}{\bigg\lceil}}}\!\!\!\!\!\!\!\!\!\!\!\!\!\!\!\!\!\!\!\!\!\underset{}{\overset{R'}{N}}\!\!\!\!\!\!\!\!\!\!\!\!\!\!\!\!\!\!\!\!\!\!\!\!\!\!\!\underset{}{\overset{}{=NH}} \qquad (6)$$

in which
R' is as defined above, or
d. a 2-arylamino -Δ²-thiazoline of the formula:

$$\underset{S}{\overset{N}{\bigg\lceil}}\!\!\!\!\!\!\!\!\!\!\!\!\!\!\!\!\!\!\!\!\!-NH\text{-}R \qquad (7)$$

in which
R is as defined above, is allowed to react with a reactive ester of an alcohol of the formula:

$$R'-OH \qquad (8)$$

in which
R' is as defined above, and when desired the 2-aryliminothiazolidine thereby obtained is converted into a physiologically acceptable salt thereof.

In process (a), compounds of the formula:

$$\text{HO}-\text{CH}_2\text{CH}_2-\overset{R'}{\underset{|}{N}}-\text{CS}-\text{NH}-R \qquad (9)$$

are generally cyclized in the presence of a strong acid, whereas
in the case of compounds of the formula:

$$X-\text{CH}_2\text{CH}_2-\overset{R'}{\underset{|}{N}}-\text{CS}-\text{NH}-R \qquad (10)$$

in which
X is halogeno or a sulphonyloxy group, for example a p-toluene sulphonyloxy radical,
cyclization is generally carried out spontaneously immediately following their preparation, without addition of an acid. This type of reaction can be supported by heating.

Reactive esters of alcohols of the formula (8) include, for example, the halides and sulphuric acid esters thereof.

The thioureas of formula (9) used as starting materials can be prepared by reaction of arylisothiocyanates of formula (11) or arylthiocarbamic acid chlorides of formula (12) with 2-aminoethanols of formula (13):

| R—NCS | R—NH—CS—Cl | HO—CH$_2$—CH$_2$—NH—R' |
|---|---|---|
| (11) | (12) | (13) |

The starting materials of formula (10) are, or example, obtained by reaction of isothiocyanates of formula (11) or of thiocarbamic acid chlorides of formula (12) with amines of the formula:

$$X-CH_2-CH_2-NH-R' \qquad (14)$$

or by reaction of thiocarbamic acid chlorides of the formula:

$$X-CH_2-CH_2-\overset{R'}{\underset{|}{N}}-CS-Cl \qquad (15)$$

with amines of formula (4) given above.

The starting substances of formula (3) can be obtained in a known manner, for example by raction of isothiocyanates of the formula (16) with the amines of formula (4) or by reaction of isothiocyanates of formula (11) or thiocarbamic acid chlorides of formula (12) with amines of formula (17):

| R'—NCS | R'—NH$_2$ |
|---|---|
| (16) | (17) |

In formulas (11) to (17), R, R' and X are as defined above.

The amines of formula (14) are, for example, obtained by reaction of hydrochlorides of the compounds of formula (13) with thionyl chloride or p-toluenesulphonic acid chloride. The compounds of formula (15) are, in turn, obtainable from them by reaction with thiophosgene. The amines of formula (14) are obtained initially as salts from the process for their preparation. The corresponding amines are liberated from the salts, before or during the reaction with the isothiocyanates or thiocarbamic acid chlorides, or with thiophosgene, by adding basic substances, as for example alkali metal hydroxides, carbonates or bicarbonates, or alkaline earth metal hydroxides, carbonates or bicarbonates, or tertiary amines.

If, for example, 2-chlorophenylisothiocyanate nd 2-methylaminoethanol are used as starting substances, the course of the reaction can be represented by the following set of equations:

$$HO-CH_2-CH_2-NH-CH_3 \;+\; SCN-\!\!\bigcirc\!\!-Cl$$

$$\longrightarrow HO-CH_2-CH_2-\overset{CH_3}{\underset{|}{N}}-CS-NH-\!\!\bigcirc\!\!-Cl \;\xrightarrow{H^+}\; \underset{S}{\overset{}{\bigg\lceil}}\!\!\overset{CH_3}{\underset{}{N}}\!\!=N-\!\!\bigcirc\!\!-Cl \qquad (18)$$

In the case of the reaction of 2-methylaminoethanol and 2,6-dichlorophenyl-thiocarbamic acid chloride, the reaction takes place in accordance with the following set of equations:

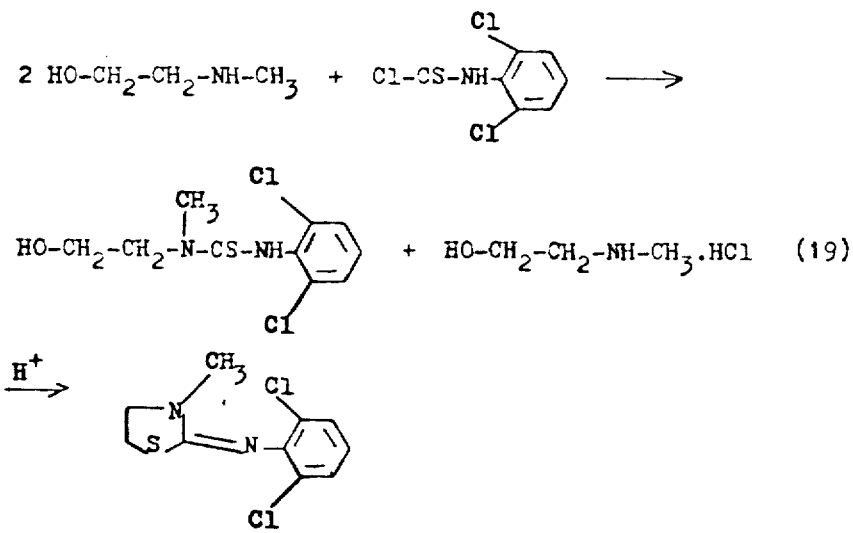

If 2-tert.-butylaminoethanol and 2-tolylisothiocyanate are used as starting substances, the reaction takes place in acordance with the following set of equations:

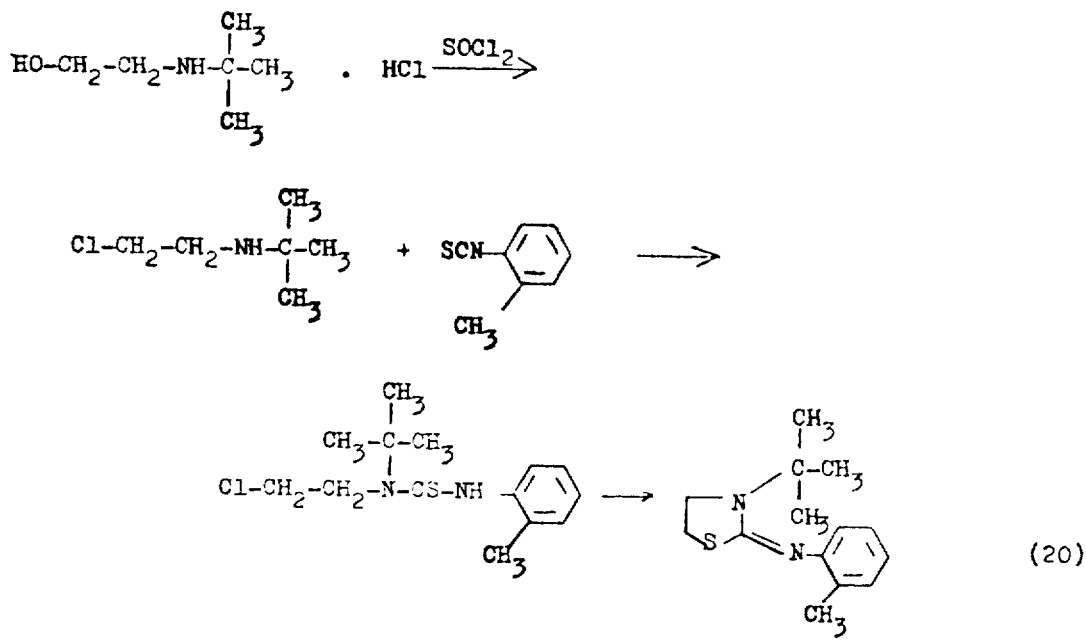

Suitable solvents or diluents for these reactions include hydrocarbons, such as benzene or ligroin, ethers such as diethyl ether or dioxane, halogenated hydrocarbons such as methylene chloride, ethylene chloride, ethylene bromide or chlorobenzene, esters such as ethyl acetate, alcohols such as ethanol, and water. The selection of the suitable solvent or diluent is determined by the stability and reactivity of the particular reactants involved. The use of a solvent or diluent is desirable in most cases, but is not absolutely essential.

Suitable acids for the cyclization of the thioureas of formula (2) or (9) include aqueous or anhydrous strong mineral and organic acids, such as, for example, hydrochloric acid, hydrobromic acid, phosphoric acid, polyphosphoric acids, sulphuric acid, benzenesulphonic acid or methanesulphonic acid.

Under these conditions, the methallyl compounds can, through a shift of the double bond, be rearranged to yield the 2,2-dimethylvinyl compounds.

The reaction temperatures can be varied within a fairly wide range. In general, the proces is carried out at 0° to 150°C, preferably at the reflux temperature of the mixture. It is frequently advantageous initially to carry out the reaction with cooling.

In carrying out the reactions, stoichiometric amounts of the starting materials can in general be employed. In some cases it is, however, adavantageous to employ a slight excess of the more easily accessible reactant.

The following may be mentioned individually as examples of arylisothiocyanates (11) which can be used: 2-tolylisothiocyanate, 2-methoxyphenylisothiocyanate, 2-trifluoromethylphenylisothiocyanate, 2-fluorophenylisothiocyanate, 2-chlorophenylisothiocyanate, 2-bromophenylisothiocyanate, 2,6-xylylisothiocyanate, 2-methoxy-6-methylphenylisothiocyanate, 2-chloro-6-methylphenylisothiocyanate, 2-chloro-6-methoxyphenylisothiocyanate, 2,6-dimethoxyphenylisothiocyanate, 2-chloro-6-trifluoromethylphenylisothiocyanate, 2-methyl-6-trifluoromethylphenylisothiocyanate, 2-methoxy-6-trifluoromethylphenylisothiocyanate, 1-naphthylisothiocyanate and 5,6,7,8-tetrahydro-1-naphthylisothiocyanate.

As examples of the arylthiocarbamic acid chlorides (12) there may be mentioned: 2,6-dichlorophenylthiocarbamic acid chloride and 2,6-dibromo-4-methylphenylthiocarbamic acid chloride.

As examles of the 2-aminoethanols (13) there may be mentioned: 2-methylaminoethanol, 2-ethylaminoethanol, 2-n-propylaminoethanol, 2-n-butylaminoethanol, 2-isopropylaminoethanol, 2-isobutylaminoethanol, 2-sec.-butylaminoethanol, 2-tert.-butylaminoethanol, 2-allylaminoethanol, 2-crotylaminoethanol, 2-methallylaminoethanol, 2-(3-chloroallylamino)-ethanol, 2-(2,3-dichloroallylamino)-ethanol, 2-(2-chloroallylamino)-ethanol and 2-(2,2-dimethylvinylamino)-ethanol.

Examples of the 2-arylimino-thiazolidines according to the invention are: 2-(2-tolylimino)-3-methyl-thiazolidine, 2-(2-methoxyphenylimino)-3-methyl-thiazolidine, 2-(2-trifluoromethylphenylimino)-3-methyl-thiazolidine, 2-(2-fluorophenylimino)-3-methyl-thiazolidine, 2-(2-chlorophenylimino)-3-methyl-thiazolidine, 2-(2-bromophenylimino)-3-methyl-thiazolidine, 2-(2,6-xylylimino)-3-methyl-thiazolidine, 2-(2-methoxy-6-methylphenylimino)-3-methyl-thiazolidine, 2-(2-chloro-6-methylphenylimino)-3-methyl-thiazolidine, 2-(2-chloro-6-methoxyphenylimino)-3-methyl-thiazolidine, 2-(2,6-dimethoxyphenylimino)-3-methyl-thiazolidine, 2-(2-chloro-6-trifluoromethylphenylimino)-3-methyl-thiazolidine, 2-(2-methyl-6-trifluoromethylphenylimino)-3-methyl-thiazolidine, 2-(2-methoxy-6-trifluoromethylphenylimino)-3-methyl-thiazolidine, 2-(2,6-dichlorophenylimino)-3-methyl-thiazolidine, 2-(1-naphthylimino)-3-methyl-thiazolidine, 2-(5,6,7,8-tetrahydro-1-naphthylamino)-3-methyl-thiazolidine, 2-(2,6-dibromo-4-methylphenylimino)-3-methyl-thiazolidine, 2-(2-tolylimino)-3-ethylthiazolidine, 2-(2-methoxyphenylimino)-3-ethyl-thiazolidine, 2-(2-trifluoromethylphenylimino)-3-ethyl-thiazolidine, 2-(2-fluorophenylimino)-3-ethyl-thiazolidine, 2-(2-chlorophenylimino)-3-ethyl-thiazolidine, 2-(2-bromophenylimino)-3-ethylthiazolidine, 2-(2,6-xylylimino)-3-ethyl-thiazolidine, 2-(2-methoxy-6-methylphenylimino)-3-ethyl-thiazolidine, 2-(2-chloro-6-methylphenylimino-3-ethyl-thiazolidine, 2-(2-chloro-6-methoxyphenylimino)-3-ethyl-thiazolidine, 2-(2,6-dimethoxyphenylimino)-3-ethyl-thiazolidine, 2-(2-chloro-6-trifluoromethylphenylimino-3-ethyl-thiazolidine, 2-(2-methyl-6-trifluoromethylphenylimino)-3-ethyl-thiazolidine, 2-(2-methoxy-6-trifluoromethylphenylimino)-3-ethyl-thiazolidine, 2-(2,6-dichlorophenylimino)-3-ethyl-thiazolidine, 2-(1-naphthylimino)-3-ethyl-thiazolidine, 2-(5,6,7,8-tetrahydro-1-naphthylimino)-3-ethyl-thiazolidine, 2-(2-tolylimino)-3-n-propyl-thiazolidine, 2-(2-methoxyphenylimino)-3-n-propyl-thiazolidine, 2-(2-trifluoromethylphenylimino)-3-n-propyl-thiazolidine, 2-(2-fluorophenylimino)-3-n-propyl-thiazolidine, 2-(2-chlorophenylimino)-3-n-propyl-thiazolidine, 2-(2-bromophenylimino)-3-n-propylthiazolidine, 2-(2,6-xylylimino)-3-n-propyl-thiazolidine, 2-(2-methoxy-6-methylphenylimino)-3-n-propyl-thiazolidine, 2-(2-chloro-6-methylphenylimino)-3-n-propyl-thiazolidine, 2-(2-chloro-6-methoxyphenylimino)-3-n-propyl-thiazolidine, 2-(2,6-dimethoxyphenylimino)-3-n-propyl-thiazolidine, 2-(2-chloro-6-trifluoromethylphenylimino)-3-n-propyl-thiazolidine, 2-(2-methyl-6-trifluoromethylphenylimino)-3-n-propyl-thiazolidine, 2-(2-methoxy-6-trifluoromethylphenylimino)-3-n-propyl-thiazolidine, 2-(2,6-dichlorophenylimino)-3-n-propyl-thiazolidine, 2-(1-naphthylimino)-3-n-propyl-thiazolidine, 2-(5,6,7,8-tetrahydro-1-naphthylimino)-3-n-propyl-thiazolidine, 2-(2-tolylimino)-3-n-butyl-thiazolidine, 2-(2-methoxyphenylimino)-3-n-butyl-thiazolidine, 2-(2-trifluoromethylphenylimino)-3-n-butyl-thiazolidine, 2-(2-fluorophenylimino)-3-n-butyl-thiazolidine, 2-(2-chlorophenylimino)-3-n-butyl-thiazolidine, 2-(2-bromophenylimino)-3-n-butyl-thiazolidine, 2-(2,6-xylylimino)-3-n-butyl-thiazolidine, 2-(2-methoxy-6-methylphenylimino)-3-n-butyl-thiazolidine, 2-(2-chloro-6-methylphenylimino)-3-n-butyl-thiazolidine, 2-(2-chloro-6-methoxyphenylimino)-3-n-butylthiazolidine, 2-(2,6-dimethoxyphenylimino)-3-n-butyl-thiazolidine, 2-(2-chloro-6-trifluoromethylphenylimino)-3-n-butyl-thiazolidine, 2-(2-methyl-6-trifluoromethylphenylimino)-3-n-butylthiazolidine, 2-(2-methoxy-6-trifluoromethylphenylimino)-3-n-butyl-thiazolidine, 2-(2,6-dichlorophenylimino)-3-n-butyl-thiazolidine, 2-(2-naphthylimino)-3-n-butyl-thiazolidine, 2-(5,6,7,8-tetrahydro-1-naphthylimino)-3-n-butyl-thiazolidine, 2-(2-tolylimino)-3-isopropyl-thiazolidine, 2-(2-methoxyphenylimino)-3-isopropyl-thiazolidine, 2-(2-trifluoromethylphenylimino)-3-isopropyl-thiazolidine, 2-(2-fluorophenylimino)-3-isopropylthiazolidine, 2-(2-chlorophenylimino)-3-isopropyl-thiazolidine, 2-(2-bromophenylimino)-3-isopropyl-thiazolidine, 2-(2,6-xylylimino)-3-isopropyl-thiazolidine, 2-(2-methoxy-6-methylphenylimino)-3-isopropyl-thiazolidine, 2-(2-chloro-6-methylphenylimino)-3-isopropyl-thiazolidine, 2-(2-chloro-6-methoxyphenylimino)-3-isopropyl-thiazolidine, 2-(2,6-dimethoxyphenylimino)-3-isopropyl-thiazolidine, 2-(2-chloro-6-trifluoromethylphenylimino)-3-isopropyl-thiazolidine, 2-(2-methyl-6-trifluoromethylphenylimino)-3-isopropyl-thiazolidine, 2-(2-methoxy-6-trifluoromethylphenylimino)-3-isopropyl-thiazolidine, 2-(2,6-dichlorophenylimino)-3-isopropyl-thiazolidine, 2(1-naphthylimino)-3-isopropyl-thiazolidine, 2-(5,6,7,8-tetrahydro-1-naphthylimino)-3-isopropyl-thiazolidine, 2-(2-tolylimino)-3-isobutyl-thiazolidine, 2-(2-methoxyphenylimino)-3-isobutyl-thiazolidine, 2-(2-trifluoromethylphenylimino)-3-isobutyl-thiazolidine, 2-(2-fluorophenylimino)-3-isobutyl-thiazolidine, 2-(2-chlorophenylimino)-3-isobutyl-thiazolidine, 2-(2-bromophenylimino)-3-isobutyl-thiazolidine, 2-(2,6-xylylimino)-3-isobutyl-thiazolidine, 2-(2-methoxy-6-methylphenylimino)-3-isobutylthiazolidine, 2-(2-chloro-6-methylphenylimino)-3-isobutylthiazolidine, 2-(2-chloro-6-methoxyphenylimino)-3-isobutylthiazolidine, 2-(2,6-dimethoxyphenylimino)-3-isobutyl-thiazolidine, 2-(2-chloro-6-trifluoromethylphenylimino)-3-isobutylthiazolidine, 2-(2-methyl-6- trifluoromethylphenylimino)-3-isobutyl-thiazolidine, 2-(2-methoxy-6-trifluoromethylphenylimino)-3-isobutyl-thiazolidine, 2-(2,6-dichlorophenylimino)-3-isobutylthiazolidine, 2-(1-naphthylimino)-3-isobutyl-thiazolidine, 2-(5,6,7,8-tetrahydro-1-naphthylimino)-3-isobutyl-thiazolidine, 2-(2-tolylimino)-3-sec.-butyl-thiazolidine, 2-(2-methoxyphenylimino)-3-sec.-butyl-thiazolidine, 2-(2-trifluoromethylphenyl-imino)-3-sec.-butyl-thiazolidine, 2-(2-fluorophenylimino)-3-sec.-butyl-thiazolidine, 2-(2-chlorophenylimino)-3-sec.-butylthiazolidine, 2-(2-bromophenylimino)-3-sec.-butyl-thiazolidine, 2-(2,6-xylylimino)-3-sec.-butyl-thiazolidine, 2-(2-methoxy-6-methylphenylimino)-3-sec.-butyl-thiazolidine, 2-(2-chloro-6-methylphenylimino)-3-sec.-butyl-thiazolidine, 2-(2-chloro-6-methoxyphenylimino)-3-sec.-butyl-thiazolidine, 2-(2,6-dimethoxyphenylimino)-3-sec.-butyl-thiazolidine, 2-(2-chloro-6-trifluoromethylphenylimino)-3-sec.-butyl-thiazolidine, 2-(2-methyl-6-trifluoromethylphenylimino)-3-sec.-butyl-thiazolidine, 2-(2-methoxy-6-trifluoromethylphenylimino)-3 -sec.butyl-thiazolidine, 2-(2,6-dichlorophenylimino)-3-sec.-butyl-thiazolidine, 2-(1-naphthylimino)-3-sec.-butyl-thiazolidine, 2-(5,6,7,8-tetrahydro-1-naphthylimino)-3-sec.-butyl-thiazolidine, 2-(2-tolylimino)- 3-tert.-butyl-thiazolidine, 2-(2-methoxyphenylimino)-3-tert.-butyl-thiazolidine, 2-(2-trifluoromethylphenylimino)-3-tert.-butyl-thiazolidine, 2-(2-fluorophenylimino-3-tert.-butyl-thiazolidine, 2-(2-chlorophenylimino)-3-tert.-butyl-thiazoline, 2-(2-bromophenylimino)-3-tert.-butyl-thiazolidine, 2-(2,6-xylylimino)-3-tert.-butyl-thiazolidine, 2-(2-methoxy-6-methylphenylimino)-3-tert.-butyl-thiazolidine, 2-(2-chloro-6-methylphenylimino)-3-tert.-butyl-thiazolidine, 2-(2-chloro-6-methoxyphenylimino)-3-tert.-butyl-thiazolidine, 2-(2,6-dimethoxyphenylimino)-3-tert.-butyl-thiazolidine, 2-(2-chloro-6-trifluoromethylphenylimino)-3-tert.-butyl-thiazolidine, 2-(2-methyl-6-trifluoromethylphenylimino)-3-tert.-butyl-thiazolidine, 2-(2-methoxy-6-trifluoromethylphenylimino)-3-tert.-butyl-thiazolidine, 2-(2,6-dichlorophenylimino)-3-tert.-butyl-thiazolidine, 2-(1-naphthylimino)-3-tert.-butyl-thiazolidine, 2-(5,6,7,8-tetrahydro-1-naphthylimino)-3-tert.-butyl-thiazolidine, 2-(2-tolylimino)-3-allyl-thiazolidine, 2-(2-methoxyphenylimino)-3-allylthiazolidine, 2-(2-trifluoromethylphenylimino)-3-allyl-thiazolidine, 2-(2-fluorophenylimino)-3-allyl-thiazolidine, 2-(2-chlorophenylimino)-3-allyl-thiazolidine, 2-(2-bromophenylimino)-3-allyl-thiazolidine, 2-(2,6-xylylimino)-3-allylthiazolidine, 2-(2-methoxy-6-methylphenylimino)-3-allylthiazolidine, 2-(2-chloro-6-methylphenylimino)-3-allylthiazolidine, 2-( 2-chloro-6-methoxyphenylimino)-3-allylthiazolidine, 2-(2,6-dimethoxyphenylimino)-3-allyl-thiazolidine, 2-(2-chloro-6-trifluoromethylphenylimino)-3-allyl-thiazolidine, 2-(2-methyl-6-trifluoromethylphenylimino)-3-allyl-thiazolidine, 2-(2-methoxy-6-trifluoromethylphenylimino)-3-allyl-thiazolidine, 2-(2,6-dicchlorophenylimino)-3-allyl-thiazolidine, 2-(1-naphthylimino)-3-allyl-thiazolidine, 2-(5,6,7,8-tetrahydro-1-naphthylimino)-3-allyl-thiazolidine, 2-(2-tolylimino-3-crotyl-thiazolidine, 2-(2-methoxyphenylimino)-3-crotyl-thiazolidine, 2-(2-trifluoromethylphenylimino)-3-crotyl-thiazolidine, 2-(2-fluorophenylimino)-3-crotyl-thiazolidine, 2-(2-chlorophenylimino)-3-crotyl-thiazolidine, 2-(2-bromophenylimino)-3-crotyl-thiazolidine, 2-(2,6-xylylimino)-3-crotyl-thiazolidine, 2-(2-methoxy-6-methylphenylimino)-3-crotyl-thiazolidine, 2-(2-chloro-6-methylphenylimino)-3-crotyl-thiazolidine, 2-(2-chloro-6-methoxyphenylimino)-3-crotyl-thiazolidine, 2-(2,6-dimethoxyphenylamino)-3-crotyl-thiazolidine, 2-(2-chloro-6-trifluoromethylphenylimino)-3-crotyl-thiazolidine, 2-(2-methyl-6-trifluoromethylphenylimino)-3-crotyl-thiazolidine 2-(2-methoxy-6-trifluoromethylphenylimino)-3-crotyl-thiazolidine, 2-(2,6-dichlorophenylimino)-3-crotyl-thiazolidine, 2-(1-naphthylimino)-3-crotyl-thiazolidine, 2-(5,6,7,8-tetrahydro-1-naphthylimino)-3-crotyl-thiazolidine, 2-(2-tolyl)-3-methallyl-thiazolidine, 2-(2-methoxyphenylimino)-3-methallyl-thiazolidine, 2-(2-trifloromethylphenylimino)-3-methallyl-thiazolidine, 2-(2-fluorophenylimino)-3-methallyl-thiazolidine, 2-(2-chlorophenylimino)-3-methallyl-thiazolidine, 2-(2-bromophenylimino)-3-methallyl-thiazolidine, 2-(2,6-xylylimino)-3-methallyl-thiazolidine, 2-(2-methoxy-6-methylimino)-3-methallyl-thiazolidine, 2-(2-chloro-6-methylphenylimino)-3 -methallyl-thiazolidine, 2-(2-chloro-6-methoxyphenylimino)-3-methallyl-thiazolidine, 2-(2,6-dimethoxyphenylimino)-3-methallyl-thiazolidine, 2-(2-chloro-6-trifluoromethylphenylimino)-3-methallyl-thiazolidine, 2-(2-methyl-6-trifluoromethylphenylimino)-3-methallyl-thiazolidine, 2-(2-methoxy-6-trifluoromethylphenylimino)-3-methallyl-thiazolidine, 2-(2,6-dichlorophenylimino)-3-methallyl-thiazolidine, 2-(2,6-xylylimino)-3-(2-chloroallyl)-thiazolidine, 2-(2-chloro-6-methylphenylimino)-3-(2-chloroallyl)-thiazolidine, 2-(2-tolylimino)-3-(3-chloroallyl)-thiazolidine, 2-(2-methoxyphenylimino)-3-(3-chloroallyl)-thiazolidine, 2-(2-trifluoromethylphenylimino)-3-(3-chloroallyl)-thiazolidine, 2-(2-fluorophenylimino)-3-(3-chloroallyl)-thiazolidine, 2-(2-chlorophenylimino-3-(3-chloroallyl)-thiazolidine, 2-(2-bromophenylimino)-3-(3-chloroallyl)-thiazolidine, 2-(2,6-xylylimino)-3-(3-chlorallyl)-thiazolidine, 2-(2-methoxy-6-methylphenylimino)-3-(3-chloroallyl)-thiazolidine, 2-(2-chloro-6-methylphenylimino)-3-(3-chloroallyl)-thiazolidine, 2-(2-chloro-6-methoxyphenylimino)-3-(3-chloroallyl)-thiazolidine, 2-(2,6-dimethoxyphenylimino)-3-(3-chloroallyl)-thiazolidine, 2-(2-chloro-6-trifluoromethylphenylimino)-3-(3-chloroallyl)-thiazolidine, 2-(2-methyl-6-trifluoromethylphenylimino)-3-(3-chloroallyl)-thiazolidine, 2-(2-methoxy-6-trifluoromethylphenylimino)-3-(3-chloroallyl)-thiazolidine, 2-(2,6-dichlorophenyl)-3-(3-chloroallyl)-thiazolidine, 2-(1-naphthylimino)-3-(3-chloroallyl)-thiazolidine, 2-(5,6,7,8-tetrahydro-1-naphthylamino)-3-(3-chloroallyl)-thiazolidine, 2-(2-tolylimino)-3-(2,3-dichloroallyl)-thiazolidine, 2-(2-methoxyphenylimino)-3-(2,3-dichloroallyl)-thiazolidine, 2-(2-trifluoromethylphenylimino)-3-(2,3-dichloroallyl)-thiazolidine, 2-(2-fluorophenylimino)-3-(2,3-dichloroallyl)-thiazolidine, 2-(2-chlorophenylimino)-3-(2,3-dichloroallyl)-thiazolidine, 2-(2-bromophenylimino)-3-(2,3-dichloroallyl)-thiazolidine, 2-(2,6-xylylimino)-3-(2,3-dichloroallyl)-thiazolidine, 2-(2-methoxy-6-methylphenylimino)-3-(2,3-dichloroallyl)-thiazolidine, 2-(2-chloro-6- methylphenylimino)-3-(2,3-dichloroallyl)-thiazolidine, 2-(2-chloro-6-methoxyphenylimino)-3-(2,3-dichloroallyl)-thiazolidine, 2-(2,6-dimethoxyphenylimine)-3-(2,3-dichloroallyl)-thiazolidine, 2-(2-chloro-6-trifluoromethylphenylimino)-3-(2,3-dichloroallyl)-thiazolidine, 2-(2-methyl-6-trifluoromethylphenylimino)-3-(2,3-dichloroallyl)-thiazolidine, 2-(2-methoxy-6-trifluoromethylphenylimino)-3-(2,3-dichloroallyl)-thiazolidine, 2-(2,6-dichlorophenylimino)-3-(2,3-dichloroallyl)-thiazolidine, 2-(1-naphthylimino)-3-(2,3-dichloroallyl)-thiazolidine and 2-(5,6,7,8-tetrahydro-1-naphthylimino)-3-(2,3-dichlorallyl)-thiazolidine.

The new substances according to the invention are basic in character and are in the main distillable oils which partly crystallise at room temperature. They can be used as free bases or in the form of their salts, for example the hydrochlorides, sulphates, phosphates, nitrates, acetates, lactates, succinates or naphthalene disulphonates.

The free bases, as well as the salts of the 2-aryliminothiazolidines according to the invention, show strong acaricidal properties, especialy against those acarids which attack, as animal ectoparasites, domesticated animals such as cattle and sheep. They are therefore well suited to combating animal ectoparasites of the order of the acarids. As ectoparasites of this nature, which are economically important, especially in tropical and sub-tropical countries, there may, for example, be mentioned: the Australian and South American cattle tick, Boophilus microplus, the South African cattle tick, Boophiulus decoloratus, and multi-host cattle ticks and sheep ticks of the genera Rhipicephalus, Amblyomma and Hyalomma, all from the family of the Ixodoidae.

Over the course of time, ticks have, in various areas, become resistant to the phosphoric acid esters and carbamates hitherto used as agents for combating them, so that in many areas the success in combating them has become dubious. To assure economical raising of animals in the areas where such attack occurs, there is therefore a requirement for agents by means of which ticks, including resistant strains, for example of the genus Boophilus, can be combated reliably. For example, in Australia the Ridgeland strain and the Biarra strain of Boophilus microplus have become highly resistant towards the phosphoric acid esters and carbamates used hitherto. The active substances according to the invention prove to be as active against the normally sensitive strains as against the resistant strains, for example of Boophilus. In doing so, they strongly inhibit the deposition of eggs by the adult forms.

In the same way, representatives from the family of the Sarcoptidae, such as the sheep scab mite (Psoroptes ovis) and the rabbit ear mite (*Psoroptes cuniculi*) can also be combated.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxilary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The active substances may be applied in any usual manner, for example by powdering, spraying, watering or atomising, or in a dip.

The present invention, therefore, also provides an acaricidal composition containing as active ingredient a compound of the present invention in admixture with a solid diluent or carrier or in admixture with a liquid diluent or carrier containing a surface-active agent.

The present invention also provides a method of combating acarids which comprises applying to the acarids or an acarid habitat a compound of the present invention alone or in the form of a composition containing as active ingredient a compound of the present in admixture with a solid or liquid diluent or carrier.

The present invention also provides a method of treating animals, whereby they are freed of or protected from ectoparasitical acarids, which comprises externally applying a compound of the present invention to the animals.

Other auxiliaries, extenders and/or surface-active agents, or active substances, such as insecticides or disinfectants, can further be admixed to the formulations or to the ready-to-use solutions.

The effectiveness of the compounds of the present invention is illustrated in and by the following Examples.

EXAMPLE A

In Vitro Test for the Inhibiting Action on the Deposition of Eggs by Ticks 3 parts of active substance are mixed with 7 parts of a mixture of equal parts by weight of ethylene glycol monomethyl ether and nonylphenol polyglycol ether. The emulsion concentraate thus obtained is diluted with water to the particular desired use concentration.

Adult gorged female ticks of the variety Boophilus microplus (resistant) are dipped for one minute into this active substance preparation. After dipping 10 female specimens of each of the various tick strains, the individual ticks are transferred into plastics dishes of which the bottom is covered with a disc of filter paper. After 35 days, the effectiveness of the active substance preparation is assessed by determining the inhibition of the deposition of fertile eggs as compared to the deposition of eggs by untreated control ticks. The action is quoted in %, with 100% denoting that fertile eggs were no longer deposited and 0% denoting that the ticks deposited eggs in the normal manner, like the untreated control ticks.

The active substances investigated, the concentration examined, the parasites tested and the results obtained are shown in Table 1 below:

TABLE 1

In vitro test of the action of inhibiting the deposition of eggs by ticks (Boophilus microplus, Biarra strain)

| Active Substance | Concentration demonstrating | |
|---|---|---|
| | 100% Inhibition | 50% Inhibition |
| 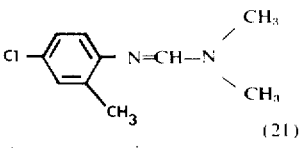 (21) (known comparison preparation) | 0.01 | 0.08 |
| 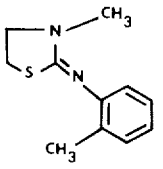 (22) | 0.1 | 0.03 |
| 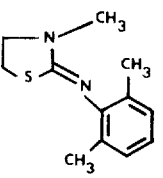 (23) | 0.1 | 0.05 |
| 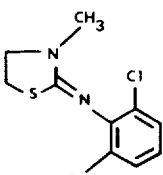 (24) | 0.03 | 0.02 |
| 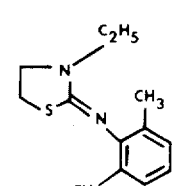 (25) | 0.1 | 0.03 |

TABLE 1-Continued

In vitro test of the action of inhibiting the deposition of eggs by ticks (Boophilus microplus, Biarra strain)

| Active Substance | Concentration demonstrating | |
|---|---|---|
| | 100% Inhibition | 50% Inhibition |
| 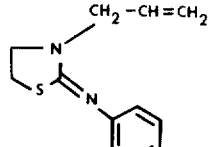 (26) | 0.01 | 0.008 |
| 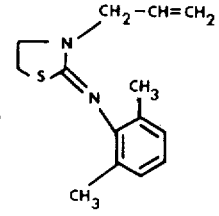 (27) | 0.03 | 0.01 |
| 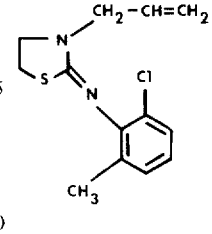 (28) | 0.01 | 0.003 |
| 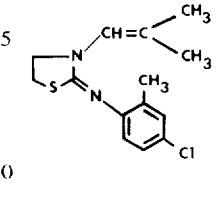 | 0.003 | 0.0005 |
| 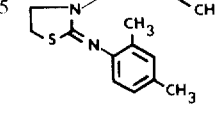 | 0.003 | 0.0015 |
| 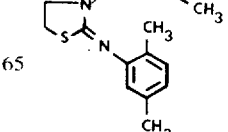 | 0.03 | 0.01 |

TABLE 1—Continued

In vitro test of the action of inhibiting the deposition of eggs by ticks (Boophilus microplus, Biarra strain)

| Active Substance | Concentration demonstrating 100% Inhibition | 50% Inhibition |
|---|---|---|
| 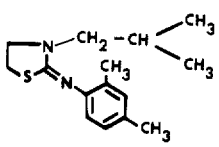 | 0.03 | 0.01 |
| 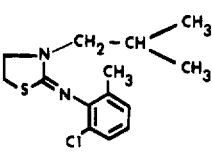 | 0.03 | 0.01 |
| 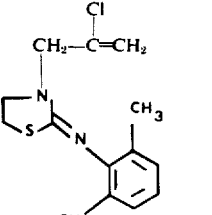 (29) | 0.03 | 0.01 |
| 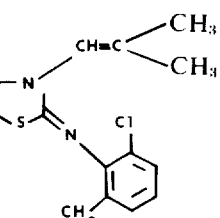 (30) | 0.01 | 0.003 |

EXAMPLE 3

In Vitro Test on Psoroptes Cuniculi 3 parts of active substance are mixed with 7 parts of a mixture of equal parts by weight of ethylene glycol monomethyl ether and nonylphenol polyglycol ether. The emulsion concentrate thus obtained is diluted with water to the particular desired use concentration.

Larvae, nymphae and adults of Psoroptes cuniculi are brought into contact with this active substance preparation. For this purpose, 3 ml of the active substance preparation are pipetted onto filter paper sandwiches, and the mites are introduced between the filter paper discs and are stored for 24 hours in Petri dishes. After 24 hours, the activity of the active substance preparation is assessed by determining the number of the dead mites. The action is recorded in %, with 100% denoting that all mites have been destroyed and 0% denoting that all mites are alive.

The active substances investigated, concentrations examined, parasites tested and results obtained are shown in Table 2 below:

TABLE 2

In vitro test of the mite-destroying action in the case of Psoroptes cuniculi

| Active Substance | Concentration demonstrating 100% Inhibition | 50% Inhibition |
|---|---|---|
| 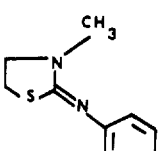 (22) | 0.03 | 0.01 |
| 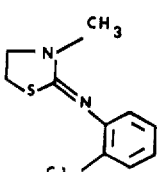 (31) | 0.03 | 0.003 |
| 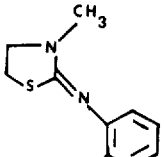 (32) | 0.03 | 0.01 |
| 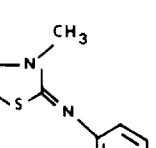 (33) | 0.03 | 0.01 |
| 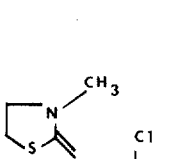 (24) | 0.03 | 0.01 |

TABLE 2-Continued

In vitro test of the mite-destroying action in the case of Psoroptes cuniculi

| Active Substance | Concentration demonstrating 100% Inhibition | 50% Inhibition |
|---|---|---|
| (34) 3-methyl-2-(2,6-dichlorophenylimino)thiazolidine | 0.03 | 0.01 |
| (35) 3-methyl-2-(1-naphthylimino)thiazolidine | 0.003 | 0.001 |
| (36) 3-methyl-2-(5,6,7,8-tetrahydro-1-naphthylimino)thiazolidine | 0.03 | 0.01 |
| (37) 3-ethyl-2-(2-chlorophenylimino)thiazolidine | 0.03 | 0.01 |
| (25) 3-ethyl-2-(2,6-dimethylphenylimino)thiazolidine | 0.03 | 0.01 |
| (38) 3-ethyl-2-(2-chloro-6-methylphenylimino)thiazolidine | 0.03 | 0.01 |
| (39) 3-n-propyl-2-(2-chlorophenylimino)thiazolidine · HCl | 0.03 | 0.01 |
| (40) 3-n-propyl-2-(2,6-dimethylphenylimino)thiazolidine · HCl | 0.03 | 0.01 |
| (41) 3-n-propyl-2-(2-chloro-6-methylphenylimino)thiazolidine · HCl | 0.03 | 0.01 |
| (42) 3-n-propyl-2-(2,6-dichlorophenylimino)thiazolidine · HCl | 0.03 | 0.01 |
| (43) 3-isopropyl-2-(2-methoxyphenylimino)thiazolidine · HCl | 0.03 | 0.01 |
| (44) 3-isopropyl-2-(2-chlorophenylimino)thiazolidine · ½ naphthalene-1,5-disulphonic acid | 0.03 | 0.01 |

TABLE 2-Continued

In vitro test of the mite-destroying action in the case of Psoroptes cuniculi

| Active Substance | Concentration demonstrating 100% Inhibition | 50% Inhibition |
|---|---|---|
| 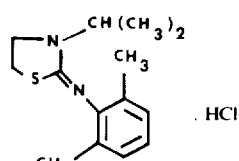 (45) . HCl | 0.03 | 0.01 |
| 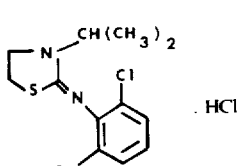 (46) . HCl | 0.03 | 0.01 |
| 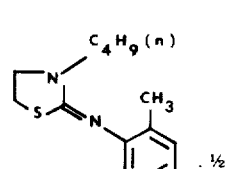 (47) . ½ naphthalene-1,5-disulphonic acid | 0.003 | 0.001 |
| 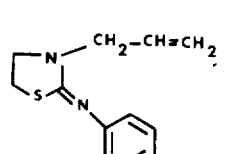 (26) | 0.03 | 0.01 |
| 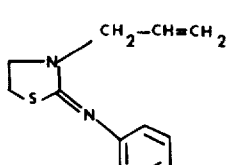 (48) | 0.03 | 0.01 |
| 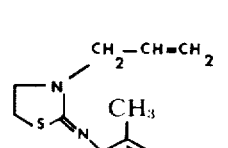 (27) | 0.03 | 0.01 |
|  (28) . HCl | 0.03 | 0.01 |
| 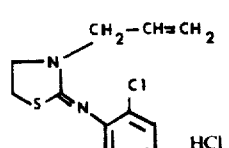 (49) | 0.03 | 0.01 |
| 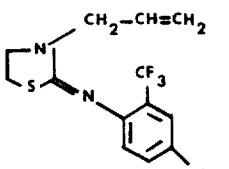 (50) | 0.03 | 0.01 |
| 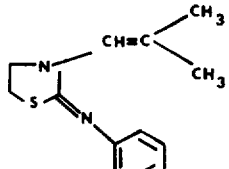 (51) | 0.03 | 0.01 |

The preparative process and representative embodiments are typified in and by the following examples which being illustrative, should not be construed as a limitation on the scope of the present invention.

EXAMPLE 1:

2-(2-Chlorophenylimino)-3-methyl-thiazolidine 135.7 g (0.8 mol) of 2-chlorophenyl-isothiocyanate are added, over the course of one-half hour, to a solution of 60 g (0.8 mol) of 2-methylaminoethanol in 500 ccs of methylene chloride, while stirring; in the course thereof, the mixture starts to boil. It is stirred for a further hour under reflux and then evaporated to dryness, the residue is treated with 480 ccs of concentrated hydrochloric acid, and the reaction mixture is stirred for 1 hour under reflux. After cooling, the batch is diluted with 1 litre of water and rendered alkaline with concentrated sodium hydroxide solution, while cooling, and The base which is formed as an oil is extracted with methylene chloride. The extract is dried over sodium sulphate and evaporated, and the residue is distilled. Boiling point: 135°–140°C/0.01 mm Hg. The yield is 147.1 g (81% of theory).

The following compounds can be prepared by processes analogous to that given above:

2-(2-Tolylimino)-3-methyl-thiazolidine, boiling point : 120°C/0.01 mm Hg, 2-(2-Methoxyphenylimino)-3-methyl-thiazolidine, hydrochloride, melting point:228° – 229°C, 2-(2-Trifluoromethylphenylimino)-3-methyl-thiazolidine, boiling point : 119° – 125°C/0.01 mm Hg, 2-(2-Bromophenylimino)-3-methyl-thiazolidine, hydrochloride, melting point : 184° – 185°C, 2-(2,6-Mylylimino)-3-methyl-thiazolidine, hydrochloride, melting point : 248° – 253°C, 2-(2-Methoxy-6-methylphenylimino)-3-methyl-thiazolidine, hydrochloride, melting point : 217° – 218°C, 2-(2-Chloro-6-methylphenylimino)-3-methyl-thiazolidine, melting point : 87° – 89°C, 2-(2,6-Dimethoxyphenylimino)-3-methyl-thiazolidine, hydrochloride, melting point : 216° – 217°C, 2-(1-Naphthylimino)-3-methyl-thiazolidine, melting point : 80° – 81°C, 2-(5,6,7,8-Tetrahydro-1-naphthylimino)-3-methyl-thiazolidine, boiling point : 192° – 198°C/0.02 mm Hg, 2-(2-Chlorophenylimino)-3-ethyl-thiazolidine, boiling point : 132° – 140°C/0.01 mm Hg, 2-(2,6-Xylylimino)-3-ethyl-thiazolidine, hydrochloride, melting point : 194° – 195°C, 2-(2-Chloro-6-methylphenylimino)-3-ethyl-thiazolidine, boiling point : 144° – 148°C/0.01 mm Hg, 2-(1-Naphthylimino)-3-ethyl-thiazolidine, melting point : 95°– 96°C, 2-(5,6,7,8-Tetrahydro-1-naphthylimino)-3-ethyl-thiazolidine, boiling point : 180° – 192°C/0.01 mm Hg, 2-(2-Chlorophenylimino)-3-n-propyl-thiazolidine, hydrochloride, melting point : 138° – 140°C, 2-(2,6-Xylylimino)-3-n-propyl-thiazolidine, hydrochloride, melting point : 190° – 191°C, 2-(2-Chloro-6-methylphenylimino)-3-n-propyl-thiazolidine, hydrochloride, melting point : 173° – 174°C, 2-(2-Chloro-6-methoxyphenylimino)-3-n-propyl-thiazolidine, melting point : 146° – 150°C, 2-(2-Methoxy-6-methylphenylimino)-3-n-propyl-thiazolidine, boiling point : 143° – 147°C/0.01 mm Hg, 2-(1-Naphthylimino)-3-n-propyl-thiazolidine, boiling point : 178° – 182°C/0.02 mm Hg, 2-(5,6,7,8-Tetrahydro-1-naphthylimino)-3-n-propyl-thiazolidine, boiling point : 184° – 187°C/0.01 mm Hg, 2-(2-Tolylimino)-3-isopropyl-thiazolidine, boiling point : 134° – 136°C/0.01 mm Hg, 2-(2-Chlorophenylimino)-3-isopropyl-thiazolidine, neutral naphthalene-1,5-disulphonate, melting point : 254° – 256°C, 2-(2-Bromophenylimino)-3-isopropyl-thiazolidine, boiling point : 137° – 142°C/0.01 mm Hg, 2-(2-Methoxyphenylimino)-3-isopropyl-thiazolidine, hydrochloride, melting point : 184° – 187°C, 2-(2,6-Xylylimino)-3-isopropyl-thiazolidine, hydrochloride, melting point : 240°C, 2-(2-Chloro-6-methylphenylimino)-3-isopropyl-thiazolidine, hydrochloride, melting point : 207° – 209°C, 2-(2-Chloro-6-methoxyphenylimino)-3-isopropyl-thiazolidine, boiling point : 148° – 153°C/0.01 mm Hg, 2-(2-Methoxy-6-methylphenylimino)-3-isopropylthiazolidine, boiling point : 156° – 160°C/0.02 mm Hg, 2-(1-Naphthylimino)-3-isopropyl-thiazolidine, melting point 97° – 99°C, 2-(5,6,7,8-Tetrahydro-1-naphthylimino)-3-isopropyl-thiazolidine, boiling point : 179° – 184°C/0.01 mm Hg, 2-(2-Tolylimino)-3-n-butyl-thiazolidine, boiling point : 147° – 149°C/0.01 mm Hg, 2-(2-Chlorophenylimino)-3-n-butyl-thiazolidine, boiling point : 146° – 156°C/0.01 mm Hg, 2-(2-Bromophenylimino)-3-n-butyl-thiazolidine, boiling point : 163° – 168°C/0.02 mm Hg, 2-(4-Chloro-2-methylphenylimino)-3-isopropyl-thiazolidine, hydrochloride, melting point: 196°–198°C, 2-(4-Chloro-2-methylphenylimino)-3-n-butyl-thiazolidine, boiling point $_{0,02}$: 160°–164°C, 2-(2,6-Xylylimino)-3-isobutyl-thiazolidine, boiling point $_{0,01}$: 160°–162°C, 2-(2,4-Xylylimino)-3-isobutyl-thiazolidine, boiling point $_{0,01}$: 144°–148°C, 2-(2,3-Xylylimino)-3-isobutyl-thiazolidine, boiling point $_{0,01}$: 160°–164°C, 2-(2-Chloro-6-methylphenylimino)-3-isobutyl-thiazolidine, boiling point $_{0,01}$: 158°–160°C, 2-(4-Chloro-2-methylphenylimino)-3-isobutyl-thiazolidine, boiling point $_{0,01}$: 148°–160°C, 2-(3-Chloro-2-methylphenylimino)-3-isobutyl-thiazolidine, boiling point $_{0,01}$: 150°–161°C, 2-(2,4-Dichlorophenylimino)-3-isobutyl-thiazolidine, boiling point $_{0,01}$: 168°–178°C, —0,012-(2-Bromophenylimino-3-isobutyl-thiazolidine, boiling point $_{0,01}$: 175°–178°C, 2-(2,4,6-Trimethylphenylimino)-3-isobutyl-thiazolidine, boiling point $_{0,01}$: 162°–164°C, 2-(2,3-Xylylimino)-3-methyl-thiazolidine, boiling point $_{0,01}$: 150°–154°C, 2-(2,4-Xylylimino)-3-methyl-thiazolidine, boiling point $_{0,01}$: 144°–148°C, 2-(4-Chloro-2-methylphenylimino)-3-methyl-thiazolidine, boiling point $_{0,01}$: 160°–164°C.

2-(2,6-Xylylimino)-3-n-butyl-thiazolidine, neutral naphthalene-1,5-disulphonate, melting point : 250° – 253°C, 2-(2-Chloro-6-methylphenylimino)-3-n-butyl-thiazolidine, hydrochloride, melting point : 143° – 144°C, 2-(2-Chloro-6-methoxyphenylimino)-3-n-butyl-thiazolidine, boiling point : 161° – 165°C/0.01 mm Hg, 2-(2-Methoxy-6-methylphenylimino)-3-n-butyl-thiazolidine, boiling point : 158° – 164°C/0.01 mm Hg, 2-(1-Naphthylimino)-3-n-butyl-thiazolidine, hydrochloride, melting point : 197° – 199°C, 2-(5,6,7,8-Tetrahydro-1-naphthylimino)-3-n-butylthiazolidine, boiling point : 193° – 197°C/0.02 mm Hg.

EXAMPLE 2

2-(2,6-Dichlorophenylimino)-3-thiozolidine

A solution of 24.3 g (0.15 mol) of 2,6-dichloroaniline and 25.8 g (150 mol) of thiophosgene in 150 ccs of dry ethylene chloride is stirred overnight under reflux. The mixture is then evaporated to dryness under reduced pressure, the crude 2,6-dichlorophenyl-thiocarbamic acid chloride is taken up in 100 ccs of absolute benzene, and the impurities are filtered off and rinsed with absolute benzene. The filtrate is slowly added dropwise, at room temperature, to a solution of 24.8 g (0.33 mol) of 2-methylaminoethanol in 100 ccs of absolute benzene, and the mixture is stirred for a further 4 hours under reflux and is again evaporated to dryness. The residue, consisting of N-(2,6-dichlorophenyl)-N'-2-hydroxyethyl-N'-methylthiourea and 2-methylaminoethanol hydrochloride, is stirred for 1 hour with 90 ccs of concentrated hydrochloric acid, under reflux. After cooling, the batch is diluted with 200 ccs of water and rendered alkaline with concentrated sodium hydroxide solution, while cooling, and the product is recrystallized from benzene-ligroin. Melting point: 110° – 113°C. The yield is 25.6 g (65.6% of theory).

The following compounds are obtained analogously:
2-(2,6-Dichlorophenylimino)-3-ethyl-thioazolidine, hydrochloride, melting point : 191° – 193°C,
2-(2,6-Dichlorophenylimino)-3-n-propyl-thiazolidine, hydrochloride, melting point : 188° – 190°C,
2-(2,6-Dichlorophenylimino)-3-isopropyl-thiazolidine, hydrochoride, melting point : 211° – 213°C,
2-(2,6-Dichlorophenylimino)-3-n-butyl-thiazolidine, hydrochloride, melting point : 160° – 162°C,
2-(2,6-Dichlorophenylimino)-3-sec.-butyl-thiazolidine, boiling point : 156° – 160°C/0.01 mm Hg,
2-(2,6-Dichlorophenylimino)-3-isobutyl-thiazolidine, boiling point : 161° – 166°C/0.02 mm Hg,
2-(2,6-Dibromo-4-methylphenylimino)-3-methyl-thiazolidine, melting point : 137° – 138°C.

EXAMPLE 3

2-(2-Tolylimino)-3-tert.-butyl-thiazolidine

A solution of 11.7 g (0.1 mol) of 2-tert.-butylaminoethanol in 50 ccs of dry benzene is saturated with dry hydrogen chloride. Thereafter, 11.4 g (0.105 mol) of thionyl chloride are added dropwise to the mixture, which is stirred for 2 hours at room temperature and then at 40° to 45°C until the evolution of gas has ceased, and is evaporated to dryness under reduced pressure. The crude 2-tert-butylaminoethyl chloride hydrochloride is taken up in 100 ccs of dry chloroform and treated with 14.9 g (0.1 mol) of 2-tolylisothiocyanate. Thereafter a solution of 10.1 g (0.1 mol) of dry triethylamine in 25 ccs of dry chloroform is added dropwise to the reaction mixture which is stirred for 2 hours at room temperature and 3 hours under reflux and evaporated to dryness under reduced pressure, the residue is taken up in water and rendered alkaline with concentrated sodium hydroxide solution, and the product is extracted with ether. The extract is dried over sodium sulphate and evaporated, and the residue is distilled. Boiling point : 145° – 148°C/0.01 mm Hg. The yield is 16.4 g (66% of theory).

The following compounds can be prepared by processes analogous to that given above:
2-(2-Chlorophenylimino)-3-tert.-butyl-thiazolidine, boiling point : 151° – 155°C/0.02 mm Hg,
2-(2-bromophenylimino)-3-tert.-butyl-thiazolidine, boiling point : 158° – 160°C/0.02 mm Hg,
2-(2-Methoxyphenylimino)-3-tert.-butyl-thiazolidine, boiling point : 152° – 155°C/0.01 mm Hg,
2-(2,6-xylylimino)-3-tert.-butyl-thiazolidine, boiling point : 153° – 155°C/0.02 mm Hg,
2-(2-Chloro-6-methylphenylimino)-3-tert.-butyl-thiazolidine, boiling point : 159° – 163°C/0.02 mm Hg,
2-(2-Chloro-6-methoxyphenylimino)-3-tert.-butyl-thiazolidine, boiling point : 154° – 157°C/0.02 mm Hg,
2-(2-Methoxy-6-methylphenylimino)-3-tert.-butyl-thiazolidine, boiling point : 152° – 158°C/0.02 mm Hg,
2-(1-Naphthylimino)-3-tert.-butyl-thiazolidine, boiling point : 167° – 171°C/0.02 mm Hg,
2-(5,6,7,8-Tetrahydro-1-naphthylimino)-3-tert.-butyl-thiazolidine, boiling point : 177° – 181°C/0.02 mm Hg.

EXAMPLE 4

2-(2-Tolylimino)-3-allyl-thiazolidine 11.9 g of 2-tolylisothiocyanate are added, over the course of one-half hour, while stirring, to a solution of 8.1 g (0.08 mol) of 2-allyl-aminoethanol in 35 ccs of methylene chloride. The mixture is stirred for a further hour under reflux and then evaporated to dryness under reduced pressure, the residue is treated with 120 g of polyphosphoric acid, and the reaction mixture is stirred for 5 hours at 80°C. After cooling, the mix is taken up in ice water and rendered alkaline with concentrated potassium hydroxide solution, the base is extracted with methylene chloride, the extract is dried over sodium sulphate and evaporated, and the residue is distilled. Boiling Point: 130° – 138°C/0.02 mm Hg. The yield is 7.7 g (41.5% of theory).

The following are obtained by processes analogous to that given above:
2-(2-Chlorophenylimino)-3-allyl-thiazolidine, boiling point: 138° – 142°C/0.01 mm Hg,
2-(2-Trifluoromethylphenylimino)-3-allyl-thiazolidine, boiling point: 128° – 132°C/0.01 mm Hg, point:
2-(2,6-Xylylimino)-3-allyl-thiazolidine, boiling point: 135° – 139°C/0.01 mm Hg,
2-(2-Chloro-6-methylphenylimino)-3-allyl-thiazolidine, boiling point: 150° – 160°C/0.01 mm Hg; hydrochloride, melting point: 165° – 166°C,
2-(1-Naphthylimino)-3-allyl-thiazolidine, boiling point: 138° – 143°C/0.01 mm Hg,
2-(2-Tolylimino)-3-crotyl-thiazolidine, boiling point: 137° – 141°C/0.02 mm Hg,
2-(2-Chlorophenylimino)-3-crotyl-thiazolidine, boiling point: 135° – 137°C/0.01 mm Hg,
2-(2-Trifluoromethylphenylimino)-3-crotyl-thiazolidine, boiling point: 133° – 137°C/0.01 mm Hg, 2-(2,6-Xylylimino)-3-crotyl-thiazolidine, boiling point: 143° – 145°C/0.01 mm Hg,
2-(2-Chloro-6-methylphenylimino)-3-crotyl-thiazolidine, boiling point: 141° – 144°C,
2-(1-Naphthylimino)-3-crotyl-thiazolidine, boiling point: 145° – 150°C/0.01 mm Hg,
2-(2-Trifluoromethylphenylimino)-3-methallyl-thiazolidine, boiling point: 132° – 136°C/0.01 mm Hg,
2-(2-Chlorophenylimino)-3-(2-chloroallyl)-thiazolidine, boiling point: 155° – 160°C/0.01 mm Hg,
2-(2-Trifluoromethylphenylimino)-3-(2-chloroallyl)-thiazolidine, boiling point: 157° – 161°C/0.01 mm Hg,
2-(2,6-Xylylimino)-3-(2-chloroallyl)-thiazolidine, boiling point: 160° – 167°C/0.02 mm Hg,
2-(2-Chloro-6-methylphenylimino)-3-(2-chloroallyl)-thiazolidine, boiling point: 161° – 164°C/0.01 mm Hg,
2-(2-Tolylimino)-3-(2,3-dichloroallyl)-thiazolidine, boiling point: 172° – 176°C/0.01 mm Hg,
2-(2-Chlorophenylimino)-3-(2,3-dichloroallyl)-thiazolidine, boiling point: 175° – 178°C/0.01 mm Hg,
2-(2,6-Xylylimino)-3-(2,3-dichloroallyl)-thiazolidine, boiling point: 178° – 182°C/0.01 mm Hg,
2-(2-Chloro-6-methylphenylimino)-3-(2,3-dichloroallyl)thiazolidine, boiling point: 180° – 185°C/0.01 mm Hg,
2-(2,6-Xylylimino)-3-(3-chloroallyl)-thiazolidine, boiling point: 158° – 163°C/0.01 mm Hg,
2-(2-Chloro-6-methylphenylimino)-3-(3-chloroallyl)-thiazolidine, boiling point: 165° – 168°C/0.01 mm Hg.
2-(2-Bromophenylimino)-3-allyl-thiazolidine, boiling point $_{0.01}$: 158°–162°C,
2-(2,3-Xylylimino)-3-allyl-thiazolidine, boiling point $_{0.01}$: 138°–142°C,
2-(2,4-Xylylimino)-3-allyl-thiazolidine, boiling point $_{0.01}$: 139°–140°C,
2-(3-Chloro-2-methylphenylimino)-3-allyl-thiazolidine, boiling point $_{0.01}$: 152°–154°C,
2-(2,4-Dichlorophenylimino)-3-allyl-thiazolidine, boiling point $_{0.01}$: 160°–168°C,
2-(2,4,6-Trimethylphenylimino)-3-allyl-thiazolidine, boiling point $_{0.01}$: 150°–152°C,
2-(2-Bromophenylimino)-3-(2,2-dimethylvinyl)-thiazolidine, boiling point $_{0.01}$: 170°–175°C,
2-(2,3-Xylylimino)-3-(2,2-dimethylvinyl)-thiazolidine, boiling point $_{0.01}$: 160°–164°C,
2-(2,4-Xylylimino)-3-(2,2-dimethylvinyl)-thiazolidine, boiling point $_{0.01}$: 152°–158°C,
2-(2,5-Xylylimino)-3-(2,2-dimethylvinyl)-thiazolidine, boiling point $_{0.01}$: 146°–162°C,
2-(3-Chloro-2-methylphenylimino)-3-(2,2-dimethylvinyl)-thiazolidine, boiling point $_{0.01}$: 165°–171°C,
2-(4-Chloro-2-methylphenylimino)-3-(2,2-dimethylvinyl)-thiazolidine, boiling point $_{0.01}$: 168°–172°C,
2-(5-Chloro-2-methylphenylimino)-3-(2,2-dimethylvinyl)-thiazolidine, boiling point $_{0.01}$: 172°–178°C,
2-(2,4-Dichlorophenylimino)-3-(2,2-dimethylvinyl)-thiazolidine, boiling point $_{0.01}$: 172°–180°C,
2-(4-Chloro-2-trifluormethylphenylimino)-3-(2,2-dimethylvinyl)-thiazolidine, boiling point $_{0.01}$: 148°–164°C, neutral naphthalene-1,5-disulfonate, melting point: 214°C,
2-(2,4,6-Trimethylphenylimino)-3-(2,2-dimethylvinyl)-thiazolidine, boiling point $_{0.01}$: 152°–154°C,
2-(2,4,5-Trichlorophenylimino)-3-(2,2-dimethylvinyl)-thiazolidine, boiling point $_{0.01}$: 180°–190°C,
2-(4-Chloro-2-methylphenylimino)-3-methallyl-thiazolidine, boiling point $_{0.01}$: 169°–175°C,
2-(2,4-Xylylimino)-3-methallyl-thiazolidine, boiling point $_{0.01}$: 156°–161°C.

EXAMPLE 5

2-(2-Chlorophenylimino)-3-methyl-thiazolidine 20.0 g (0.1 mol) of 1-(2-chlorophenyl)-3-methyl-thiourea together with 100 g of 1,2-dibromopropane are stirred for 8 hours under reflux. After cooling, the crystals which have separated out are filtered off, rinsed with ether and dissolved in warm water, and the mixture is rendered alkaline with concentrated sodium hydroxide solution. The oily base is extracted with methylene chloride, the extract is dried over sodium sulphate and evaporated, and the residue is distilled. Boiling point: 138 : 145°C/0.02 mm Hg. The yield is 13.2 g (58% of theory).

EXAMPLE 6

2-(2-Chloro-6-methylphenylimino)-3-ethyl-thiazolidine

A solution of 8.9 (0.1 mol) of 2-ethylaminoethanol in 50 ccs of dry benzene is saturated with hydrogen chloride. Thereafter, 11.4 g (0.105 mol) of thionyl chloride are added drop-wise to the mixture, which is stirred for 2 hours at room temperature and thereafter under reflux until the evolution of gas has ceased, and the batch is evaporated to dryness under reduced pressure. The crude 2-ethylaminoethyl chloride hydrochloride is taken up in 50 ccs of water and treated with a solution of 13.0 g (0.113 mol) of thiophosgene in 50 ccs of ethylene chloride. 19 g of powdered calcium carbonate are then introduced in portions over the course of approximately 4 hours, while stirring vigorously. Stirring of the mixture is continued at room temperature until no further evolution of gas occurs (approximately 6 hours), the organic phase is separated off, dried over sodium sulphate and slowly treated, while stirring, with a solution of 14.1 g (0.1 mol) of 2-chloro-6-methylaniline and 10.1 g (0.1 mol) of triethylamine in 20 ccs of ethylene chloride, and the reaction mixture is stirred for 2 hours at room temperature and subsequently for 4 hours under reflux. After cooling, the batch is twice extracted by shaking with dilute sodium hydroxide solution, the organic phase is dried over sodium sulphate and evaporated, and the residue is distilled. Boiling point: 145° – 148°C/0.01 mm Hg. The yield is 15.8 g (62% of theory).

EXAMPLE 7

2-(2-Chlorophenylimino)-3-methyl-thiazolidine

A mixture of 13.3 g (0.1 mol) of 2-thiono-3-methylthiazolidine, 12.8 g (0.1 mol) of 2-chloroaniline and 50 ccs of chlorobenzene is heated to 140°C for 2 hours, while stirring. Thereafter the solution is evaporated under reduced pressure and the residue is distilled. Boiling point: 138° – 141°C/0.01 mm Hg. The yield is 12.2 g (54% of theory).

EXAMPLE 8

2-(2-Chloro-6-methylphenylimino)-3-allyl-thiazolidine 18.4 g (0.1 mol) of 2-chloro-6-methylphenylisothiocyanate are added over the course of 1/2 hour, while stirring, to a solution of 6.8 g (0.1 mol) of 90 per cent strength 2-aminoethanol in 50 ccs of methylene chloride. The mixture is stirred for a further hour under reflux and then evaporated to dryness under reduced pressure, the residue is treated with 40 ccs of concentrated hydrochloric acid, and the reaction mixture is stirred for 1 hour under reflux. After cooling, the batch is diluted with 120 ccs of water and rendered alkaline with concentrated sodium hydroxide solution, while cooling, and the 2-(2-chloro-6-methylphenylamino)-thiazoline, obtained in the form of crystals of melting point 141°– 143°C, is filtered off. After drying, it is dissolved in 150 ccs of dry benzene and 12. 1 g (0.1 mol) of allyl bromide are added over the course of one-half hour. The reaction mixture is stirred for 1 hour at 50°C and 2 hours under reflux and after cooling is thoroughly shaken with 60 ccs of 10 per cent strength sodium hydroxide solution until the crystals have dissolved. After separating the phases, the aqueous layer is additionally twice extracted with benzene. The combined benzene phases are dried over sodium sulphate and subsequently saturated with dry hydrogen chloride. The hydrochloride which precipitates is filtered off and recrystallized from ethanol-ether, and melts at 165° – 166°C. The yield is 24.9 g (82% of theory).

EXAMPLE 9

The following compounds may be prepared by processes analogous to that described in Example 4:

2-(4-Chloro-2-methylphenylimino)-3-allyl-thiazolidine, boiling point: 180° – 188°C/0.05 mm Hg, 2-(4-Chloro-2-trifluoromethylphenylimino)-3-allyl-thiazolidine, boiling point: 144° – 150°C/0.01 mm Hg, 2-(2-Tolylimino)-3-(2,2-dimethylvinyl)-thiazolidine, neutral naphthalene-1,5-disulphonate, melting point 212° – 216°C, 2-(2-Chlorophenylimino)-3-(2,2-dimethylvinyl)-thiazolidine, boiling point: 147° – 160°C/0.01 mm Hg, 2-(2,6-Xylylimino)-3-(2,2-dimethylvinyl)-thiazolidine, neutral naphthalene-1,5-disulphonate, melting point 232° – 235°C, 2-(2-Chloro-6-methylphenylimino)-3-(2,2-dimethylvinyl)-thiazolidine, hydrochloride, melting point: 182° – 186°C, 2-(4-Chloro-2-trifluoromethylphenylimino)-3-(2-chloroallyl)-thiazolidine, boiling point: 152° – 158°C/0.01 mm Hg.

What is claimed is:

1. An acaricidal composition comprising an effective amount of a compound selected from the group consisting of a 2-aryliminothiazolidine of the formula:

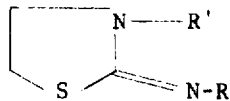

wherein
R is phenyl substituted by one to three members selected from the group consisting of lower alkyl, lower alkoxy, halogeno or trifluoromethyl, one of said substituents being in the 2-position; 1-naphthyl or 5,6,7,8-tetrahydro-1-naphthyl, and
R' is lower alkyl, lower alkenyl or lower chloroalkenyl, and the physiologically acceptable acid addition salts thereof, in admixture with a liquid or solid diluent or carrier.

2. The composition according to claim 1, in which the compound is selected from the group consisting of a 2-aryliminothiazolidine of the formula:

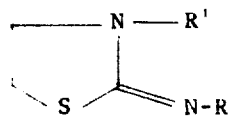

wherein
R is phenyl substituted by one to three members selected from the group consisting of lower alkyl, lower alkoxy, halogeno or trifluoromethyl, one of said substituents being in the 2-position; 1-naphthyl; or 5,6,7,8-tetrahydro-1-naphthyl; and
R' is lower alkenyl or lower chloroalkenyl; and the physiologically acceptable acid addition salts thereof.

3. The composition according to claim 1, wherein R is 2-substituted phenyl, 2,6-disubstituted phenyl, 2,4-disubstituted phenyl or 2,4,6-trisubstituted phenyl in which the substituents are selected from the group consisting of methyl, methoxy, fluoro, chloro, bromo or trifluoromethyl and R' is allyl, crotyl, methallyl, 2,2-dimethylvinyl, 2-chloroallyl, 3-chloroallyl or 2,3-dichloroallyl.

4. The composition according to claim 1 wherein R is phenyl substituted by one to three members selected from the group consisting of lower alkyl, lower alkoxy, halogeno or trifluoromethyl, one of said substituents being in the 2-position.

5. The composition according to claim 1 wherein R is 1-naphthyl or 5,6,7,8-tetrahydro-1-naphthyl.

6. The composition according to claim 1 wherein R is 2-substituted phenyl, 2,6-disubstituted phenyl, 2,4-disubstituted phenyl or 2,4,6-trisubstituted phenyl in which the substituents are selected from the group consisting of methyl, methoxy, fluoro, chloro, bromo or trifluoromethyl and R' is methyl, ethyl, n-propyl, isopropyl, n-butyl, isobutyl, sec.-butyl, tert.butyl, allyl, crotyl, methallyl, 2,2-dimethylvinyl, 2-chloroallyl, 3-chloroallyl or 2,3-dichloroallyl.

7. The composition according to claim 1 in which said compound is 2-(3-tolylimino)-3-methylthiazolidine.

8. The composition according to claim 1 in which said compound is 2-(2,6-xylylimino)-3-methylthiazolidine.

9. The composition according to claim 1 in which said compound is 2-(2-chloro-6-methylphenylimino)-3-methylthiazolidine.

10. The composition according to claim 1 in which said compound is 2-(2,6-xylylimino)-3-ethylthiazolidine.

11. The composition according to claim 1 in which said compound is 2-(2-tolylimino)-3-allylthiazolidine.

12. The composition according to claim 1 in which said compound is 2-(2,6-xylylimino)-3-allylthiazolidine.

13. The composition according to claim 1 in which said compound is 2-(2-chloro-6-methylphenylimino)-3-allylthiazolidine.

14. The composition according to claim 1 in which said compound is 2-(2,6-xylylimino)-3-(2-chloroallyl)thiazolidine.

15. The composition according to claim 1 in which said compound is 2-(2-chlorophenylimino)-3-methylthiazolidine.

16. The composition according to claim 1 in which said compound is 2-(2-bromophenylimino)-3-methylthiazolidine.

17. The composition according to claim 1 in which said compound is 2-(2-trifluoromethylphenylimino)-3-methylthiazolidine.

18. The composition according to claim 1 in which said compound is 2-(2,6-dichlorophenylimino)-3-methylthiazolidine.

19. The composition according to claim 1 in which said compound is 2-(1-naphthylimino)-3-methylthiazolidine.

20. The composition according to claim 1 in which said compound is 2-(5,6,7,8-tetrahydro-1-naphthylimino)-3-methylthiazolidine.

21. The composition according to claim 1 in which said compound is 2-(2-chlorophenylimino)-3-ethylthiazolidine.

22. The composition according to claim 1 in which said compound is 2-(2-chloro-6-methylphenylimino)-3-ethylthiazolidine.

23. The composition according to claim 1 in which said compound is 2-(2-chlorophenylimino)-3-n-propylthiazolidine.

24. The composition according to claim 1 in which said compound is 2-(2,6-xylylimino)-3-n-propylthiazolidine.

25. The composition according to claim 1 in which said compound is 2-(2-chloro-6-methylphenylimino)-3-n-propylthiazolidine.

26. The composition according to claim 1 in which said compound is 2-(2,6-dichlorophenylimino)-3-n-propylthiazolidine.

27. The composition according to claim 1 in which said compound is 2-(2-methoxyphenylimino)-3-isopropylthiazolidine.

28. The composition according to claim 1 in which said compound is 2-(2-chlorophenylimino)-3-isopropylthiazolidine.

29. The composition according to claim 1 in which said compound is 2-(2,6-xylylimino)-3-isopropylthiazolidine.

30. The composition according to claim 1 in which said compound is 2-(2-chloro-6-methylphenylimino)-3-isopropylthiazolidine.

31. The composition according to claim 1 in which said compound is 2-(2,6-xylylimino)-3-n-butylthiazolidine.

32. The composition according to claim 1 in which said compound is 2-(2-chlorophenylimino)-3-allylthiazolidine.

33. The composition according to claim 1 in which said compound is 2-(2-chloro-6-methylphenylimino)-3-(2,2-dimethylvinyl)thiazolidine.

34. The composition according to claim 1 in which said compound is 2-(2-trifluoromethyl-4-chlorophenylimino)-3-allylthiazolidine.

35. The composition according to claim 1 in which said compound is 2-(2-chlorophenylimino)-3-(2,2-dimethylvinyl)thiazolidine.

36. The composition according to claim 1 in which said compound is 2-(2-trifluoromethyl-4-chlorophenylimino)-3-(2-chloroallyl)thiazolidine.

37. The composition according to claim 1 in which said compound is 2-(2,4-xylylimino)-3-(2,2-dimethylvinyl)thiazolidine.

38. The composition according to claim 1 in which said compound is 2-(2-methyl-4-chlorophenylimino)-3-(2,2-dimethylvinyl)thiazolidine.

39. A composition according to claim 1 in which said compound is the hydrochloride, sulfate, phosphate, nitrate, acetate, lactate, succinate or naphthalenedisulfonate salt.

40. The method of combatting acarids which comprises applying an acaricidally effective amount of a compound selected from the group consisting of a 2-aryliminothiazolidine of the formula:

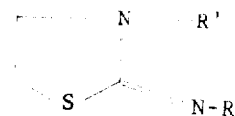

wherein
R is phenyl substituted by one to three members selected from the group consisting of lower alkyl, lower alkoxy, halogeno or trifluoromethyl, one of said substituents being in the 2-position; 1-naphthyl or 5,6,7,8-tetrahydro-1-naphthyl, and
R' is lower alkyl, lower alkenyl or lower chloroalkenyl, and the physiologically acceptable acid addition salts thereof, to an acarid habitat so as to permit contact with the acarid.

41. The method according to claim 40, wherein R is phenyl substituted by one to three members selected from the group consisting of lower alkyl, lower alkoxy, halogeno or trifluoromethyl, one of said substituents being in the 2-position.

42. The method according to claim 40, wherein R is 1-naphthyl or 5,6,7,8-tetrahydro-1-naphthyl.

43. The method according to claim 40, wherein R is 2-substituted phenyl, 2,6-disubstituted phenyl, 2,4-disubstituted phenyl or 2,4,6-trisubstituted phenyl in which the substituents are selected from the group consisting of methyl, methoxy, fluoro, chloro, bromo or trifluoromethyl and R' is methyl, ethyl, n-propyl, isopropyl, n-butyl, isobutyl, sec.-butyl, tert.butyl, allyl, crotyl, methallyl, 2,2-dimethylvinyl, 2-chloroallyl, 3-chloroallyl or 2,3-dichloroallyl.

44. The method according to claim 40, in which said compound is 2-(3-tolylimino)-3-methylthiazolidine.

45. The method according to claim 40, in which said compound is 2-(2,6-xylylimino)-3-methylthiazolidine.

46. The method according to claim 40, in which said compound is 2-(2-chloro-6-methylphenylimino)-3-methylthiazolidine.

47. The method according to claim 40, in which said compound is 2-(2,6-xylylimino)-3-ethylthiazolidine.

48. The method according to claim 40, in which said compound is 2-(2-tolylimino)-3-allylthiazolidine.

49. The method according to claim 40, in which said compound is 2-(2,6-xylylimino)-3-allylthiazolidine.

50. The method according to claim 40, in which said compound is 2-(2-chloro-6-methylphenylimino)-3-allylthiazolidone.

51. The method according to claim 40, in which said compound is 2-(2,6-xylylimino)-3-(2-chloroallyl)thiazolidine.

52. The method according to claim 40, in which said compound is 2-(2-chlorophenylimino)-3-methylthiazolidine.

53. The method according to claim 40, in which said compound is 2-(2-bromophenylimino)-3-methylthiazolidine.

54. The method according to claim 40, in which said compound is 2-(2-trifluoromethylphenylimino)-3-methylthiazolidine.

55. The method according to claim 40, in which said compound is 2-(2,6-dichlorophenylimino)-3-methylthiazolidine.

56. The method according to claim 40, in which said compound is 2-(1-naphthylimino)-3-methylthiazolidine.

57. The method according to claim 40, in which said compound is 2-(5,6,7,8-tetrahydro-1-naphthylimino)-3-methylthiazolidine.

58. The method according to claim 40, in which said compound is 2-(2-chlorophenylimino)-3-ethylthiazolidine.

59. The method according to claim 40, in which said compound is 2-(2-chloro-6-methylphenylimino)-3-ethylthiazolidine.

60. The method according to claim 40, in which said compound is 2-(2-chlorophenylimino)-3-n-propylthiazolidine.

61. The method according to claim 40, in which said compound is 2-(2,6-xylylimino)-3-n-propylthiazolidine.

62. The method according to claim 40, in which said compound is 2-(2-chloro-6-methylphenylimino)-3-n-propylthiazolidine.

63. The method according to claim 40, in which said compound is 2-(2,6-dichlorophenylimino)-3-n-propylthiazolidine.

64. The method according to claim 40, in which said compound is 2-(2-methoxyphenylimino)-3-isopropylthiazolidine.

65. The method according to claim 40, in which said compound is 2-(2-chlorophenylimino)-3-isopropylthiazolidine.

66. The method according to claim 40, in which said compound is 2-(2,6-xylylimino)-3-isopropylthiazolidine.

67. The method according to claim 40, in which said compound is 2-(2-chloro-6-methylpnenylimino)-3-isopropylthiazolidine.

68. The method according to claim 40, in which said compound is 2-(2,6-xylylimino)-3-n-butylthiazolidine.

69. The method according to claim 40, in which said compound is 2-(2-chlorophenylimino)-3-allylthiazolidine.

70. The method according to claim 40, in which said compound is 2-(2-chloro-6-methylphenylimino)-3-(2,2-dimethylvinyl)thiazolidine.

71. The method according to claim 40, in which said compound is 2-(2-trifluoromethyl-4-chlorophenylimino)-3-allylthiazolidine.

72. The method according to claim 40, in which said compound is 2-(2-chlorophenylimino)-3-(2,2-dimethylvinyl)-thiazolidine.

73. The method according to claim 40, in which said compound is 2-(2-trifluoromethyl-4-chlorophenylimino)-3-(2-chloroallyl)-thiazolidine.

74. The method according to claim 40, in which said compound is 2-(2,4-xylylimino)-3-(2,2-dimethylvinyl)-thiazolidine.

75. The method according to claim 40, in which saic compound is 2-(2-methyl-4-chlorophenylimino)-3-(2,2-dimethylvinyl)thiazolidine.

76. The method according to claim 40, in which saic compound is the hydrochloride, sulfate, phosphate, nitrate, acetate, lactate, succinate or naphthalenedisulfonate salt.

77. The method according to claim 40, in which saic compound is selected from the group consisting of a 2-aryliminothiazolidine of the formula:

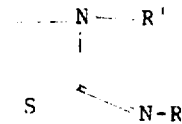

wherein

R is phenyl substituted by one to three members selected from the group consisting of lower alkyl, lower alkoxy, halogeno or trifluoromethyl, one of said substituents being in the 2-position; 1-naphthyl; or 5,6,7,8-tetrahydro-1-naphthyl; and R' is lower alkenyl or lower chloroalkenyl; and the physiologically acceptable acid addition salts thereof.

78. The method according to claim 40, wherein R is 2-substituted phenyl, 2,6-disubstituted phenyl, 2,4-disubstituted phenyl or 2,4,6-trisubstituted phenyl in which the substituents are selected from the group consisting of methyl, methoxy, fluoro, chloro, bromo or trifluoromethyl and R' is allyl, crotyl, methallyl, 2,2-dimethylvinyl, 2-chloroallyl, 3-chloroallyl or 2,3-dichloroallyl.

79. A composition for use against acarids, comprising an amount effective to inhibit deposition of eggs by the adult form of an acarid of a compound selected from the group consisting of a 2-aryliminothiazolidine of the formula:

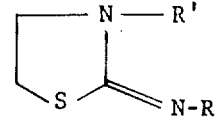

wherein

R is phenyl substituted by one to three members selected from the group consisting of lower alkyl, lower alkoxy, halogeno or trifluoromethyl, one of said substituents being in the 2-position; 1-naphthyl or 5,6,7,8-tertrahydro-1-naphthyl, and R' is lower alkyl, lower alkenyl or lower chloroalkenyl, and the physiologically acceptable acid addition salts thereof, in admixture with a liquid or solid diluent or carrier.

80. The composition according to claim 79, wherein the compound is 2-(2-tolylimino)-3-methylthiazolidine.

81. The composition according to claim 79, wherein the compound is 2-(2,6-xylylimino)-3-methylthiazolidine.

82. The composition according to claim 79, wherein the compound is 2-(2-chloro-6-methylphenylimino)-3-methyl-thiazolidine.

83. The composition according to claim 79, wherein the compound is 2-(2,6-xylylimino)-3-ethyl-thiazolidine.

84. The composition according to claim 79, wherein the compound is 2-(2-tolylylimino)-3-allyl-thiazolidine.

85. The composition according to claim 79, wherein the compound is 2-(2,6-xylylimino)-3-allyl-thiazolidine.

86. The composition according to claim 79, wherein the compound is 2-(2-chloro-6-methylphenylimimo)-3-allylthiazolidine.

87. The composition according to claim 79, wherein the compound is 2-(4-chloro-2-methylphenylimino)-3-(2,2-dimethylvinyl)-thiazolidine.

88. The composition according to claim 79, wherein the compound is 2-(2,4-xylylimino)-3-(2,2-dimethylvinyl)-thiazolidine.

89. The composition according to claim 79, wherein the compound is 2-(2,5-xylylimino)-3-(2,2-dimethylvinyl)-thiazolidine.

90. The composition according to claim 79, wherein the compound is 2-(2,4-xylylimino)-3-isobutyl-thiazolidine.

91. The composition according to claim 79, wherein the compound is 2-(2-chloro-6-methylphenylimino)-3-isobutyl-thiazolidine.

92. The composition according to claim 79, wherein the compound is 2-(2,6-xylylimino)-3-(2-chloroallyl)-thiazolidine.

93. The composition according to claim 79, wherein the compound is 2-(2-chloro-6-methylimino)-3-(2,2-dimethylvinyl)-thiazolidine.

94. A method of inhibiting deposition of eggs by the adult form of an acarid, which comprises applying to the adult form of an acarid or to an acarid habitat so as to permit contact with the adult form of the acarid, an amount effective to inhibit deposition of eggs by the adult form of the acarid of a compound selected from the group consisting of a 2-aryliminothiazolidine of the formula:

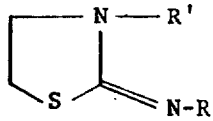

wherein
R is phenyl substituted by one to three members selected from the group consisting of lower alkyl, lower alkoxy, halogeno or trifluoromethyl, one of said substituents being in the 2-position; 1-naphthyl or 5,6,7,8-tetrahydro-1-naphthyl, and
R' is lower alkyl, lower alkenyl or lower chloroalkenyl, and the physiologically acceptable acid addition salts thereof.

95. The method according to claim 94, wherein said compound is 2-(2-tolylimino)-3-methyl-thiazolidine.

96. The method according to claim 94, wherein said compound is 2-(2,6-xylylimino)-3-methyl-thiazolidine.

97. The method according to claim 94, wherein said compound is 2-(2-chloro-6-methylphenylimino)-3-methyl-thiazolidine.

98. The method according to claim 94, wherein said compound is 2-(2,6-xylylimino)-3-ethyl-thiazolidine.

99. The method according to claim 94, wherein said compound is 2-(2-tolylimino)-3-ethyl-thiazolidine.

100. The method according to claim 94, wherein said compound is 2-(2,6-xylylimino)-3-allyl-thiazolidine.

101. The method according to claim 94, wherein said compound is 2-(2-chloro-6-methylphenylimino)-3-allyl-thiazolidine.

102. The method according to claim 94, wherein said compound is 2-(4-chloro-2-methylphenylimino)-3-(2,2-dimethylvinyl)-thiazolidine.

103. The method according to claim 94, wherein said compound is 2-(2,4-xylylimino)-3-(2,2-dimethylvinyl)-thiazolidine.

104. The method according to claim 94, wherein said compound is 2-(2,5-xylylimino)-3-(2,2-dimethylvinyl)-thiazolidine.

105. The method according to claim 94, wherein said compound is 2-(2,4-xylylimino)-3-isobutyl-thiazolidine.

106. The method according to claim 94, wherein said compound is 2-(2-chloro-6-methylphenylimino)-3-isobutyl-thiazolidine.

107. The method according to claim 95, wherein said compound is 2-(2,6-xylylimino)-3-(2-chloroallyl)-thiazolidine.

108. The method according to claim 96, wherein said compound is 2-(2-chloro-6-methylimino)-3-(2,2-dimethylvinyl)-thiazolidine.

* * * * *

UNITED STATES PATENT OFFICE
CERTIFICATE OF CORRECTION

Patent No. 3,898,340         Dated August 5, 1975

Inventor(s) Otto Behner and Wilhelm Stendel

It is certified that error appears in the above-identified patent and that said Letters Patent are hereby corrected as shown below:

In claims 1, 2, 40 and 77, the structural formula should appear as follows:

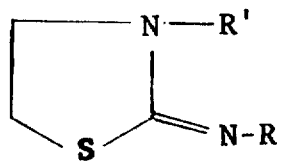

Signed and Sealed this eleventh Day of November 1975

[SEAL]

Attest:

RUTH C. MASON
Attesting Officer

C. MARSHALL DANN
Commissioner of Patents and Trademarks